US006910252B2

(12) United States Patent
Draggie et al.

(10) Patent No.: US 6,910,252 B2
(45) Date of Patent: Jun. 28, 2005

(54) APPARATUS FOR REMOVING A FASTENER FROM A WORKPIECE

(75) Inventors: Raymond Q. Draggie, Spokane, WA (US); Scott D. Maxwell, Renton, WA (US); Dale H. Smith, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/400,983

(22) Filed: Mar. 27, 2003

(65) Prior Publication Data

US 2004/0187284 A1 Sep. 30, 2004

(51) Int. Cl.[7] ................................................ B23P 19/04
(52) U.S. Cl. .......................................... 29/263; 254/18
(58) Field of Search ................................ 254/29 A, 18; 29/263, 264, 269

(56) References Cited

U.S. PATENT DOCUMENTS 2,467,982 A * 4/1949 Maris .......................... 29/263
3,066,913 A * 12/1962 Leeson ........................ 254/18
3,727,491 A 4/1973 Buckwalter
4,658,488 A * 4/1987 Johnstead .................... 29/259
4,798,106 A 1/1989 Foster
5,604,967 A 2/1997 McMahon
6,601,277 B1 * 8/2003 Swanson ..................... 29/264

* cited by examiner

*Primary Examiner*—Robert C. Watson
(74) *Attorney, Agent, or Firm*—Alston & Bird LLP

(57) ABSTRACT

An apparatus is provided for removing a fastener from a corresponding aperture defined by a workpiece that reduces or eliminates damage to the fastener and/or the workpiece. The apparatus includes a pulling plug for engaging the head of the fastener, and a drive shaft operably connected to the pulling plug. The apparatus further includes a lever member that is urged into operable contact with the workpiece. In operation, the head end of a fastener is engaged by the pulling plug. Thereafter, the lever member is moved into contact with the workpiece. The drive shaft is then retracted while the lever member continues to be urged into operable contact with and to push against the workpiece without positively engaging the workpiece. As such, the pulling plug is also moved away from the surface of the workpiece to remove the fastener from the workpiece.

21 Claims, 5 Drawing Sheets

APPARATUS FOR REMOVING A FASTENER FROM A WORKPIECE

FIELD OF THE INVENTION

The present invention relates generally to an apparatus for removing a fastener, such as a bolt, a pin, a rivet or the like, from a corresponding aperture defined by a workpiece and, more particularly, to an apparatus for removing a fastener from a workpiece without damaging the fastener or the workpiece which may be utilized in instances in which the fastener may only be accessed from the head end and, as a result, cannot be punched or pushed out.

BACKGROUND OF THE INVENTION

From time to time, fasteners, such as bolts, pins, rivets or the like, may need to be removed from various structures in order to partially or completely disassemble the structures. For example, various structures, including aircraft, undergo life cycle testing that requires at least some disassembly at one or more intervals during the lifetime of the structure. Additionally, structures that are involved in accidents may be disassembled during the investigation into the cause and/or the results of the accident.

In instances in which fasteners are removed from a structure, the fasteners are preferably removed without damaging either the fastener or the workpiece. In this regard, the structure from which fasteners are removed is frequently reassembled following an inspection and/or the performance of various maintenance activities. As such, it would be desirable, both from a cost and an efficiency standpoint, to reassemble the structure utilizing most, if not all, of the same components. By removing the fasteners without damaging the fasteners or the workpiece, the same fasteners can subsequently be reinstalled without having to rework the workpiece and, in particular, without having to rework the apertures defined by the workpiece in which the fasteners are installed. Moreover, in instances in which fasteners are removed from a structure in order to perform life cycle testing or during an accident investigation, the evidentiary value of the fasteners, as well as the workpiece, is significantly diminished if the condition of the fastener and/or the workpiece is altered or damaged during the disassembly process.

Conventional techniques for removing a fastener utilize a drift or a punch to apply axial force to the end of the fastener opposite the head end so as to push the fastener out of the corresponding aperture defined by the workpiece. With respect to a bolt, for example, the nut must first be removed from the threaded end of the bolt and a drift or punch is then utilized to push the bolt out of the corresponding aperture. Depending upon the design of the structure, however, the end of the fastener opposite the head end, such as the threaded end of a bolt, may be relatively inaccessible such that a drift or a punch cannot be utilized to push the fastener out of the corresponding aperture. In these situations, a wrench or the like may oftentimes be inserted from a direction substantially perpendicular to the longitudinal axis of the bolt so as to engage and remove the nut from the fastener. However, the surrounding structure oftentimes prevents access to the threaded end of the bolt with a drift or punch to thereafter remove the bolt.

Additionally, some structures may be at least partially forward of relatively soft material, such as aluminum, that may be damaged by the use of a drift or punch, thereby further limiting the use of a drift or punch. Furthermore, some structures may define at least partially threaded apertures that threadably engage the fastener, such as a bolt or the like. In these instances, a drift or punch is also generally inappropriate since attempts to merely push the fastener out of the threaded aperture would be either ineffective and/or would damage the threads defined by the aperture and/or the fastener.

In these instances, a fastener must generally be pulled or pried out of the corresponding aperture from the head end of the fastener. In order to pull a fastener out from the head end, a vice grip, pliers or the like are utilized to grasp the head end of the fastener. However, the force required to pull a fastener, such as a bolt, from the corresponding aperture may be substantial due, at least in part, to the generally snug fit of the fastener within the aperture. Moreover, it is generally difficult to securely grasp the head end of the fastener and the vice grip, pliers or the like may tend to slip off if attempts are made to pull the fastener.

Depending upon the structure from which the fasteners are extracted, the head end of the fastener may be inaccessible with a vice grip, pliers or the like. In addition, pulling a fastener from the corresponding aperture may damage the head end and/or threads of the fastener as well as the aperture. For example, the pulling force applied to the fastener may serve to misalign the fastener relative to the aperture, thereby damaging the fastener and/or the aperture. As a result of the relatively tight tolerances between the apertures defined by the workpiece and the corresponding fasteners, pulling the fasteners from the corresponding apertures may also induce thread scrubbing of the fastener and, in instances in which the aperture is threaded, of the threaded aperture.

In these instances in which the fastener is damaged during its removal, the fastener must generally be replaced prior to reassembly of the structure. Additionally, any apertures that were damaged during the disassembly process must be reworked prior to reassembly of the structure, thereby significantly increasing the time and expense associated with reassembling the structure.

As such, it would be desirable to provide an improved tool for removing fasteners from structures without damaging the fasteners or the structure, thereby permitting the structure to be reassembled utilizing the same fasteners with a minimum, if any, rework of the structure. In addition, it would be desirable to provide an improved tool for removing fasteners from workpieces in instances in which the end of the fastener opposite the head end is inaccessible with a drift or a punch.

SUMMARY OF THE INVENTION

An improved apparatus is provided according to embodiments of the present invention for removing a fastener, such as a bolt, a pin, a rivet or the like, from a corresponding aperture defined by a workpiece which reduces, if not eliminates, damage to the fastener and/or the workpiece that might otherwise be occasioned by conventional disassembly techniques. In this regard, the apparatus of embodiments of the present invention removes the fastener from the head end while maintaining a removal force that is in axial alignment with the fastener and centered on the corresponding aperture defined by the workpiece, thereby avoiding damage to the fastener and the workpiece. By removing the fastener from the head end, the apparatus can remove fasteners in situations in which the other end of the fastener is inaccessible with a drift or a punch. In addition, the apparatus of some embodiments of the present invention rotates the fastener as the fastener is removed from the corresponding aperture, thereby further preventing damage to threaded fasteners and/or threaded apertures, such as by thread scrubbing, during the removal process. In contrast, the apparatus of other embodiments removes the fastener without rotating the fastener, thereby avoiding enlarging the aperture such as in instances in which the fastener is bent, for example.

An apparatus for removing a fastener from a corresponding aperture defined by a workpiece includes a pulling plug for engaging the head of the fastener. In instances in which the head of the fastener has a polygonal shape, such as the polygonal head of a bolt, the pulling plug may include a plurality of interior surfaces that are angularly disposed with respect to one another. The angularly disposed interior surfaces of the pulling plug of this embodiment define an interior cavity that receives and mates with the polygonal head of a fastener.

The apparatus of the present invention also includes a drive shaft operably connected to the pulling plug. Thus, rotation of the drive shaft also rotates the pulling plug. In instances in which the pulling plug includes a plurality of angularly disposed interior surfaces for mating with the polygonal head of a fastener, rotation of the drive shaft not only rotates the pulling plug, but also the fastener. The apparatus of the present invention further includes a lever member capable of being urged into operable contact with a surface of the workpiece. Advantageously, the lever member is urged into operable contact with the surface of the workpiece so as to push against the surface of the workpiece without gripping or otherwise positively engaging the workpiece.

The lever member may therefore have a first end with a shape corresponding to the surface of the workpiece. For example, the first end of the lever member may be disposed at a non-orthogonal angle relative to the drive shaft. The first end of the lever member may include a flange or washer to spread the load over a larger area of the workpiece to avoid damaging the workpiece, a feature particularly attractive for workpieces formed of relatively soft materials. In addition, the first end of the lever may define a notch for accepting the head of another fastener or some other raised feature of the workpiece. The lever member of one embodiment includes an interchangeable end member to permit the shape of the first end to be selectively varied, typically based upon the shape of the workpiece. As such, the apparatus may be utilized in conjunction with workpieces of various shapes with the end member of the lever member generally being selected such that the first end of the lever member has a shape corresponding to that of the surface of the workpiece.

In operation, the head end of a fastener is engaged by the pulling plug. In this regard, the pulling plug is capable of extending beyond the lever member in order to engage and disengage the fastener. Thereafter, the lever member is moved into contact with the workpiece. The drive shaft is then capable of being retracted in a direction away from the workpiece while the lever member continues to be urged into operable contact with the surface of the workpiece without gripping or otherwise positively engaging the workpiece. As such, the pulling plug is also moved away from the surface of the workpiece as a result of the retraction of the drive shaft in order to remove the fastener from the aperture defined by the workpiece.

The lever member generally defines a cylindrical passage through which the drive shaft at least partially extends. Additionally, the lever member may include a collar defining an aperture for snugly receiving the drive shaft. By continuing to urge the lever member into operable contact with the surface of the workpiece while the fastener is being removed from the aperture and by maintaining the desired positional relationship between the lever member and the drive shaft, such as a result of the snug fit of the drive shaft within the aperture defined by the collar of the lever member, the apparatus of the present invention may remove the fastener while maintaining an axis of force centered on the aperture, perpendicular to the workpiece and in-line with the fastener being removed, thereby avoiding damage to the fastener or the aperture.

In one embodiment, the lever member and, most commonly, the collar of the lever member, is threadably connected to the drive shaft. According to one removal technique, the drive shaft may be threadably retracted in order move the pulling plug and, in turn, the head end of the fastener away from the surface of the workpiece, while the lever member remains in operable contact with the surface of the workpiece. In the embodiment in which the pulling plug includes a plurality of angularly disposed interior surfaces that define an interior cavity for receiving and mating with the polygonal head of a fastener, the threaded retraction of the drive shaft also rotates and threadably retracts the fastener. By threadably retracting the fastener, the apparatus of this embodiment further avoids damage to the fastener as well as any threaded aperture in which the fastener is installed. In order to facilitate the threaded retraction of the drive shaft, the drive shaft may be rotated by various means including turning the drive shaft with a wrench that engages a nut/lock nut combination that is mounted upon the drive shaft, or rotating the drive shaft with a drive tool.

According to another removal technique, the lever member is threadably advanced along the drive shaft. Thus, the fastener is pulled from the workpiece without causing the fastener to rotate. In instances in which the fastener is bent, therefore, this removal technique permits the fastener to be removed without enlarging the aperture.

In another embodiment, the lever member does not threadably engage the drive shaft, although the lever member may still include a collar defining an aperture for snugly receiving the drive shaft. In this embodiment, the apparatus may also include a mechanized actuator, such as a pneumatic actuator, a hydraulic actuator, an electric solenoid or the like, for retracting the drive shaft in a direction away from the workpiece. As such, the pulling plug is correspondingly retracted in order to remove the fastener from the aperture defined by the workpiece. In this embodiment, the apparatus may also include a spring for urging the drive shaft and the pulling plug toward the workpiece once the mechanized actuator is deactivated.

Accordingly, the apparatus of the present invention permits fasteners to be removed from corresponding apertures defined by a workpiece with less risk of damaging the fasteners and the workpiece than conventional fastener removal techniques. In this regard, the apparatus generally maintains alignment between the fastener and the corresponding aperture during the process of removing the fastener. Additionally, the apparatus may threadably retract fasteners, such as threaded fasteners, in order to facilitate the removal of the fasteners from corresponding apertures defined by the workpiece and to further avoid damage, such as thread scrubbing, to the threaded fastener and/or correspondingly threaded apertures defined by the workpiece.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
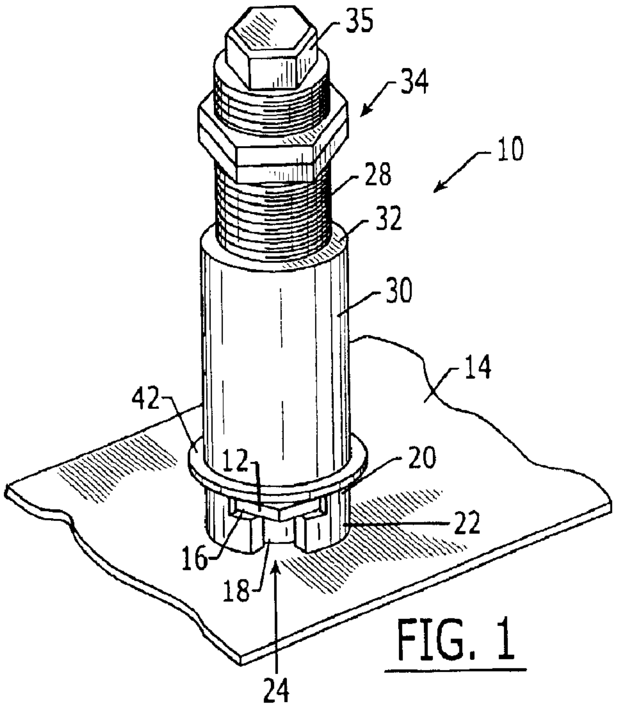
FIG. 1 is a perspective view of an apparatus for removing a fastener according to one embodiment of the present invention following the engagement of the head end of the fastener.

Referring now to FIG. 1, an apparatus 10 for removing a fastener 12 from a corresponding aperture defined by a workpiece 14 is depicted. The apparatus is capable of removing a variety of fasteners such as bolts, pins, rivets and the like. Regardless of the type of fastener, the fastener has a head end 16 that is accessible while the fastener is installed in the corresponding aperture defined by the workpiece. For example, the fastener may include a head end that sits upon or is recessed relative to the surface of the workpiece. In either instance, the head end is larger than the shaft 18 of the fastener that extends through the corresponding aperture. Additionally, the apparatus is capable of removing fasteners from a wide variety of workpieces, including workpieces formed of metal and composite materials. In one embodiment, the apparatus is utilized to remove fasteners from an airframe assembly. However, the apparatus may be utilized to remove fasteners from a wide variety of other structures, if so desired.

Regardless of the type of structure, the workpiece 14 advantageously defines one or more apertures through which corresponding fasteners 12 extend. In instances in which the fasteners are threaded, such as bolts, the apertures may also be at least partially internally threaded. While the aperture may have a greater length than the fastener in some circumstances, a fastener generally completely extends through the aperture such that the head end 16 of the fastener is seated upon or recessed within one surface of the workpiece while the other end of the fastener extends beyond the opposed surface of the workpiece. For bolts or other threaded fasteners, a nut may also be threadably engaged on the end of the bolt opposite the head end.

Figure 2:
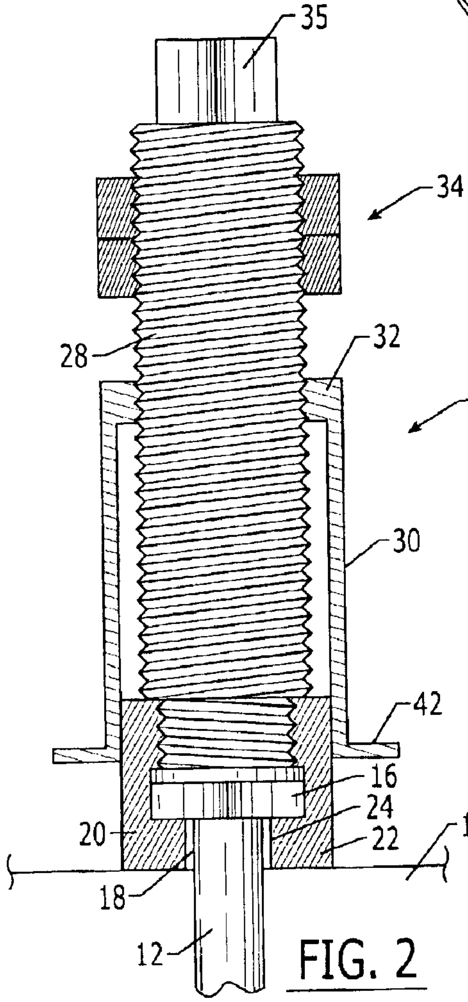
FIG. 2 is a cross-sectional view of the apparatus of FIG. 1.

In order to remove the fastener 12, such as during disassembly of the structure for life cycle testing, an accident investigation or for any other reason, the apparatus 10 of the present invention initially engages the head end 16 of the fastener. In this regard, the apparatus includes a pulling plug 20 for engaging the head end of the fastener. As shown in FIGS. 1 and 2, and as explained more fully below, the pulling plug may extend beyond the remainder of the apparatus to engage the fastener. In one embodiment, the pulling plug has a generally cylindrical shape that defines a passage extending lengthwise therethrough. A first end 22 of the pulling plug, namely, the end of the pulling plug proximate the workpiece 14, defines a lengthwise extending slot or opening 24 for receiving the head end of the fastener. Thus, the first end of the pulling plug is not completely cylindrical, but, instead, has a generally U-shape. The slot defined by the first end of the pulling plug opens into an internal cavity that is sized and shaped to receive the head end of the fastener. In instances in which the head end of the fastener has a polygonal shape, such as the polygonal head of a bolt, the first end of the pulling plug may include a plurality of interior surfaces angularly disposed with respect to one another so as to define an interior cavity having a polygonal shape that matches and engages the polygonal head end of the fastener.

The first end 22 of the pulling plug 20 proximate the workpiece 14 also includes an inwardly extending flange. This flanged end of the pulling plug also defines an opening therethrough which is sized to be smaller than the internal cavity. In particular, the opening defined by the flanged end of the pulling plug is sized to be smaller than the head end 16 of the fastener 12, but slightly larger than that portion of the shaft 18 of the fastener proximate the head end. As such, the pulling plug can engage the fastener such that the head end of the fastener is disposed within the internal cavity defined by the pulling plug, and the flanged end of the pulling plug is disposed beneath the bead end of the fastener and between the head end of the fastener and the surface of the workpiece such that the shaft of the fastener extends through the opening defined by the flanged end of the pulling plug. Thus, force applied by the pulling plug in a direction away from the surface of the workpiece would be applied to the fastener via the engagement of the head end of the fastener by the flanged end of the pulling plug.

Figure 3:
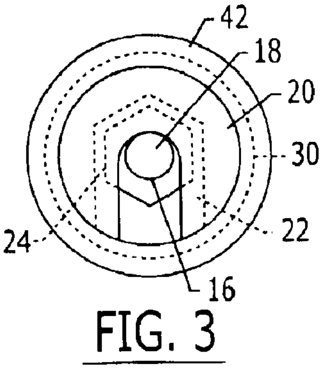
FIG. 3 is an end cross-sectional view of the apparatus of FIGS. 1 and 2.

As best shown in FIG. 3, the passage extending lengthwise through the pulling plug 20, including the interior cavity and the opening defined by the inwardly extending flange of the first end 22 of the pulling plug, is preferably centered. As such, the apparatus 10 can apply relatively equal force across the width of the head end 16 of the fastener 12 to further assist in the extraction of the fastener in an axial direction so as to avoid damage to the fastener and/or the corresponding aperture.

The apparatus 10 also includes a drive shaft 28. The drive shaft may be at least partially threaded. In one illustrated embodiment that will be described below, the drive shaft is threaded along its entire length to permit fasteners 12 having a wide variety of lengths to be extracted. However, other embodiments of the apparatus of the present invention include a drive shaft in which only portions are threaded or in which the drive shaft is unthreaded along its entire length.

The drive shaft 28 is connected, generally at a first end, to the pulling plug 20. Although the drive shaft may be connected to the pulling plug in various manners, the first end of the drive shaft may be threaded as illustrated in FIGS. 1 and 2 such that the drive shaft may threadably engage the pulling plug. In the illustrated embodiment, for example, the second end of the pulling plug, opposite the flanged end, defines an internally threaded portion for engaging the drive shaft. As described below, the threaded first end of the drive shaft that engages the pulling plug advantageously has threads of the opposite orientation from other threaded portions of the drive shaft, i.e., left-handed threads as opposed to right-handed. By engaging the pulling plug with threads of the opposite orientation, the pulling plug and the drive shaft remain connected during the threaded retraction of the drive shaft during extraction of a fastener 12. While the drive shaft is shown to be threadably attached to the pulling plug in the illustrated embodiment, the drive shaft and the pulling plug may be integrally formed or otherwise attached in other embodiments. By threadably attaching or otherwise removably attaching the pulling plug to the drive shaft, however, the versatility of the apparatus 10 of this embodiment of the present invention is enhanced since pulling plugs that are designed to receive and engage fasteners having head ends 16 with different sizes and shapes can be alternatively threadably attached to the drive shaft. In embodiments in which both the drive shaft and the fastener are threaded, the threads of the drive shaft also generally have the opposite orientation to the threads of the fastener being removed.

The apparatus 10 of the present invention also includes a lever member 30 for operably contacting the surface of the workpiece 14 during the removal of a fastener 12. In the illustrated embodiment, the lever member has a cylindrical shape and defines an internal passage centered within the lever member through which at least a portion of the drive shaft 28 extends. In addition, the pulling plug 20 is advantageously disposed within one end of the internal passage defined by the lever member while the fastener 12 is being removed. In order to prevent the flanged first end 22 of the pulling plug from spreading radially outwardly during the process of removing the fastener and thereby potentially allowing the head end 16 of the fastener to become disengaged from the pulling plug, the lever member preferably defines the internal passage to be shaped and sized to closely approximate the exterior shape and size of the pulling plug. In one embodiment in which both the lever member and the pulling plug have a generally cylindrical shape, the inner diameter of the lever member is about 0.005 inch to 0.010 inch larger than the exterior diameter of the pulling plug.

As shown in FIGS. 1–5, the lever member 30 may include a flanged end 42 for operably contacting the workpiece 14. The flanged end extends radially outwardly from the cylindrical portion of the lever member. Thus, the flanged end effectively spreads the forces applied by the apparatus 10 to the workpiece over a greater area of the workpiece. The spreading of the forces provided by the flanged end of the lever member is particularly advantageous in instances in which the workpiece is formed of a relatively soft material, such as aluminum, that may otherwise be damaged by the forces generated during the fastener removal process. Although the lever member depicted in FIGS. 1–5 is of a unitary or integral design, the flanged end of the lever member may be interchangeable as described below in conjunction with the embodiment of FIG. 8 in order to mate with a variety of differently shaped workpieces. While the flanged end of the lever member is advantageous as described above, the lever member need not include the flanged end and the end may, instead, have the same shape and profile as the remainder of the cylindrical lever member, if desired.

As described below, the apparatus 10 is preferably designed such that the pulling plug 20 is capable of extending beyond the lever member in order to engage the head end 16 of the fastener 12 prior to removal operations as shown in FIGS. 1 and 2, and to be disengaged from the head end of the fastener once the fastener has been removed from the workpiece 14. The relative positions of the lever member and the pulling plug may be altered during the process of removing the fastener from the workpiece, however, by moving the lever member toward and into operable contact with the workpiece so as to surround and support the pulling plug during the process of removing the fastener from the workpiece, as shown in FIGS. 4 and 5.

Figure 4:
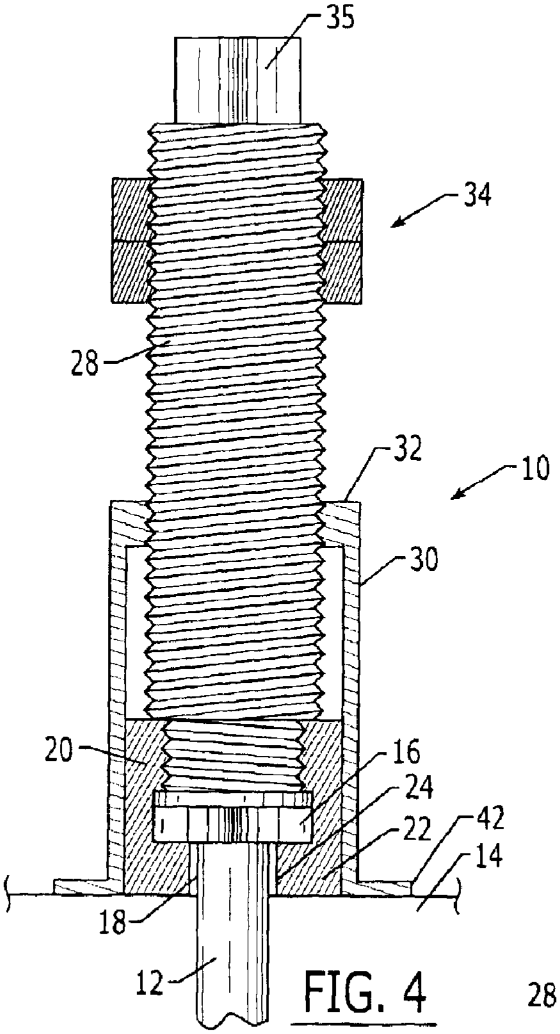
FIG. 4 is a cross-sectional view of the apparatus of FIGS. 1–3 once the lever member has been urged into operable contact with the surface of the workpiece.
Figure 5:
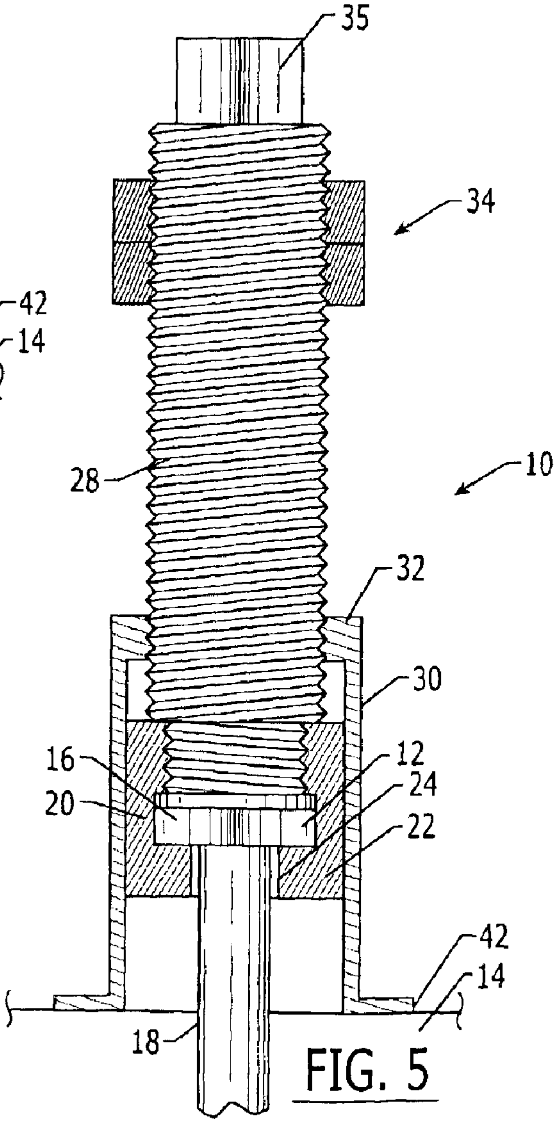
FIG. 5 is a cross-sectional view of the apparatus of FIGS. 1–4 once the drive shaft has been retracted during the process of removing the fastener from the workpiece.

In operation, the pulling plug 20 engages the head end 16 of the fastener 12 as shown in FIGS. 1 and 2, and the lever member 30 is then moved into operable contact with the surface of the workpiece 14 as shown in FIG. 4. By thereafter moving the drive shaft 28 and, in turn, the pulling plug in a direction away from the surface of the workpiece, while maintaining the lever member in operable contact with the surface of the workpiece, the fastener may be extracted as shown in FIG. 5. The apparatus 10 of the present invention provides for the drive shaft and the pulling plug to be retracted while the lever member is maintained in operable contact with the workpiece in various manners. In the embodiment depicted in FIGS. 1–5, the lever member threadably engages the drive shaft in such a manner that rotation of the drive shaft causes the drive shaft and, in turn, the pulling plug to be retracted relative to the surface of the workpiece while maintaining the lever member in operable contact with the workpiece. In this embodiment, the lever member includes a collar 32 that is internally threaded. As depicted, the collar may be integral with the remainder of the lever member and may be disposed at one end of the lever member, such as the end of the lever member opposite the workpiece. Alternatively, the collar may be disposed at other locations along the length of the lever member so long as the collar remains rearward of the pulling plug once the pulling plug has been retracted relative to its fullest extent to the lever member. In this regard, in order to have the versatility to extract fasteners having a length ranging from a relatively short length to a much longer length, the lever member should have a length such that the spacing between the collar of the lever member and the pulling plug, once the lever member has been disposed in operable contact with the workpiece, is approximately equal to the maximum length of the fasteners that the apparatus is designed to extract less the cumulative thickness of the head end of the fastener and the flanged first end 22 of the pulling plug.

As mentioned above, the drive shaft 28 may be threaded along its entire length. In alternative embodiments, however, only that portion of the drive shaft is threaded that will threadably engage the collar 32 of the lever member 30. In this embodiment, the length of the threaded portion of the drive shaft that threadably engages the collar of the lever member should have a sufficient length such that the lever member can be threadably retracted to permit the pulling plug to engage the head end of the fastener and can thereafter be threadably advanced into operable contact with the workpiece 14.

In any event, the lever member 30 and the collar 32 of the lever member is advantageously threaded in the opposite direction or sense than the threaded end portion of the drive shaft that engages the pulling plug 20. Thus, the pulling plug rotates with the drive shaft as the drive shaft is threadably retracted, while the lever member remains in operable contact with the surface of the workpiece 14.

The drive shaft 28 also advantageously includes an engagement element to permit the drive shaft to be engaged and rotated, such as to move the pulling plug 20 and, in turn, the fastener 12 in a direction away from the surface of the workpiece 14. In the illustrated embodiment, for example, the nut and lock nut combination 34 are threaded onto the drive shaft. The nut and lock nut combination may then be engaged by a wrench or the like and turned so as to threadably retract the drive shaft. Alternatively, the drive shaft may have a head 35, typically disposed on the end of the drive shaft opposite the pulling plug. The head of the drive shaft of this embodiment may be engaged by a mechanized socket wrench or other drive tool, for example, to facilitate the threaded retraction of the drive shaft.

Figure 6:
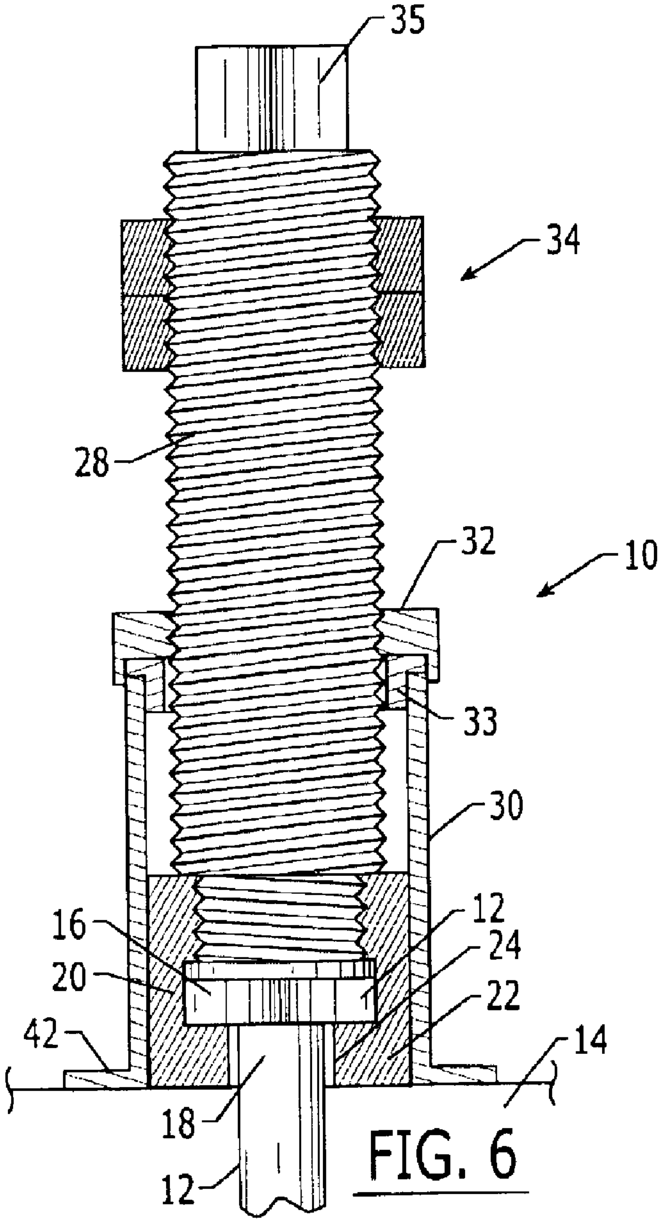
FIG. 6 is a cross-sectional view of an apparatus according to another embodiment of the present invention in which the lever member is adapted to be threadably advanced relative to the drive shaft.

In instances in which the fastener 12 is removed by threadably retracting the drive shaft 28 and the interior cavity of the pulling plug 20 engages the head end 16 of the fastener, the fastener will rotate in unison with the drive shaft. The rotation may actually help to remove the fastener by, in effect, lifting the fastener from the aperture. In some instances, however, the apparatus 10 preferably removes the fastener without causing the fastener to rotate. For example, fasteners that are bent are desirably removed without causing the fastener to rotate since the rotation of the fastener will enlarge the aperture. In these instances, the lever member may be threadably advanced while the drive shaft is prevented from rotation. The threaded advancement of the lever member also causes the drive shaft and the pulling plug to be moved away from the surface of the workpiece, thereby extracting the fastener. To facilitate the threaded advancement of the lever member, the collar 32 of the lever member may have flats such as by being turned as shown in FIG. 6 in order to have a square, hexagonal or other polygonal shape that may be engaged by a wrench or the like. Additionally, a bushing 33 may be disposed between the collar and the cylindrical portion of the lever member so as to permit relative rotation of the collar with respect to the cylindrical portion of the lever member.

Figure 7:
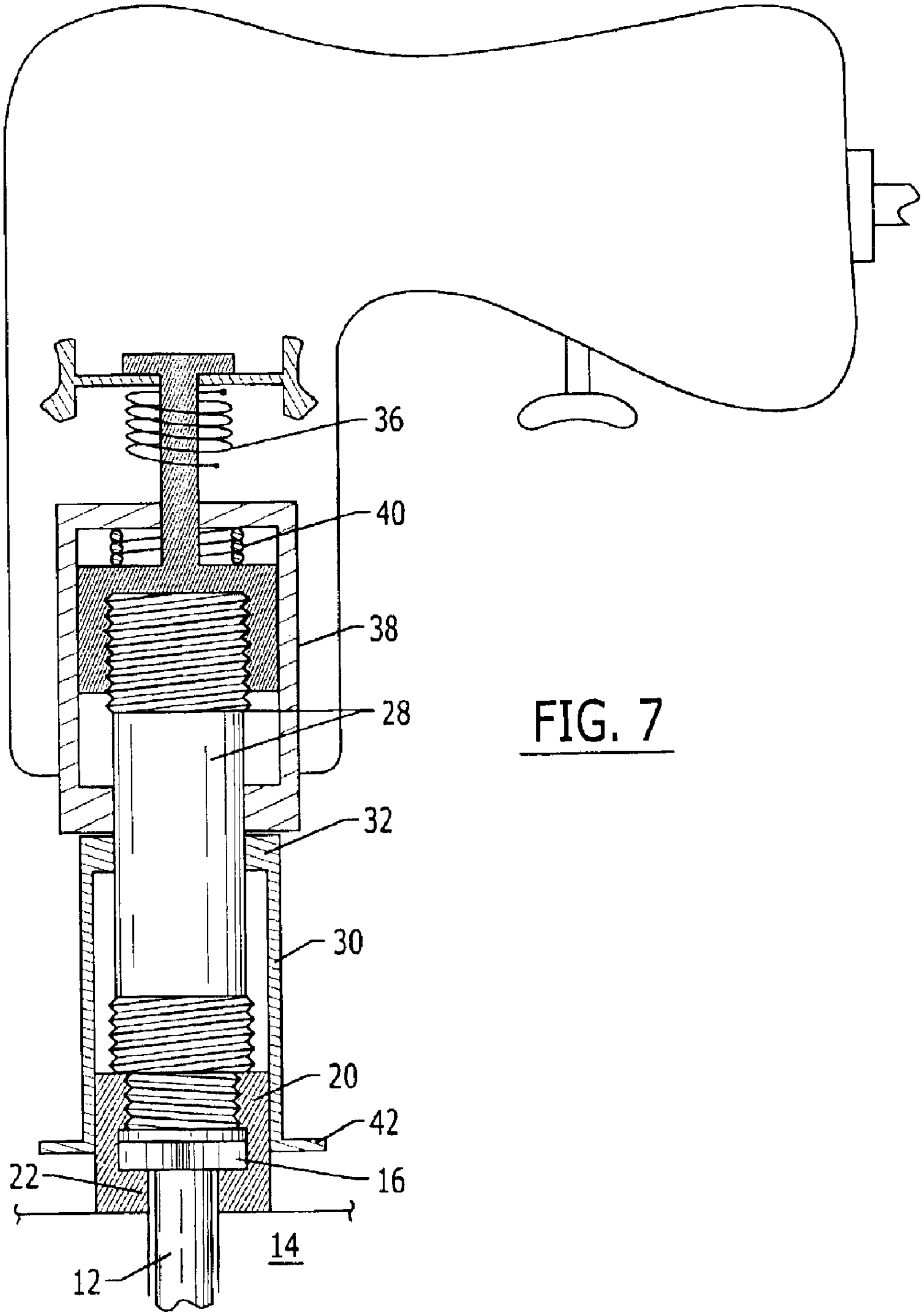
FIG. 7 is a schematic representation of an apparatus for removing a fastener according to another embodiment of the present invention which includes a mechanized actuator for retracting the drive shaft.

Alternatively, the drive shaft 28 may be unthreaded along either its entire length or at least a majority of its length. In this embodiment, the lever member 30 does not threadably engage the drive shaft. However, the lever member generally still includes a collar 32 defining an opening that snugly receives the drive shaft such that the lever member remains centered and aligned about the drive shaft. In this embodiment, as depicted in FIG. 7, the pulling plug 20 is again attached to or integral with one end of the drive shaft. The other end of the drive shaft may be engaged by a mechanized actuation mechanism 36, such as a hydraulic actuator, a pneumatic actuator or an electric solenoid as schematically depicted in FIG. 7. In operation, the mechanized actuation mechanism retracts the drive shaft in a direction away from the surface of the workpiece 14. The apparatus of this embodiment also includes a fixed element 38 for engaging the lever member, such as the collar of the lever member, and preventing corresponding retraction of the lever member. As the drive shaft is retracted, therefore, the first end of the lever member operably engages the surface of the workpiece such that further retraction of the drive shaft removes the fastener 12 from the aperture defined by the workpiece. As shown, the apparatus of this embodiment may also include a return spring 40 such that upon deactivation of the mechanized actuation mechanism, the drive shaft is again extended such that the pulling plug extends beyond the lever member.

As also shown in FIG. 7, the end of the lever member 30 that is proximate the workpiece 14 may include a radially extending flange, such as a radially outwardly extending flange 42, to distribute the force that the apparatus 10 will apply to the workpiece over a broader area of the workpiece. Additionally, the flanged end of the lever member may have a shape that matches the shape of the surface of the workpiece surrounding the fastener 12 to be extracted such that the fastener is maintained in an aligned relationship with the corresponding opening defined by the workpiece while the fastener is being removed, thereby avoiding damage to the fastener and/or the opening. As such, the flanged end of the lever member may not lie within a plane perpendicular to the longitudinal axis of the drive shaft 28. Instead, the flanged end of the lever member can be disposed at a non-orthogonal angle to the longitudinal axis defined by the drive shaft, and may have a non-planar shape to match the shape of curved workpieces. Still further, the flanged end of the lever member may define one or more notches for receiving the head end of other fasteners or other features that extend outwardly from the surface of the workpiece that are located in the proximity of the fastener to be removed. Thus, the apparatus of the present invention is capable of removing fasteners from workpieces having various different shapes.

Figure 8:
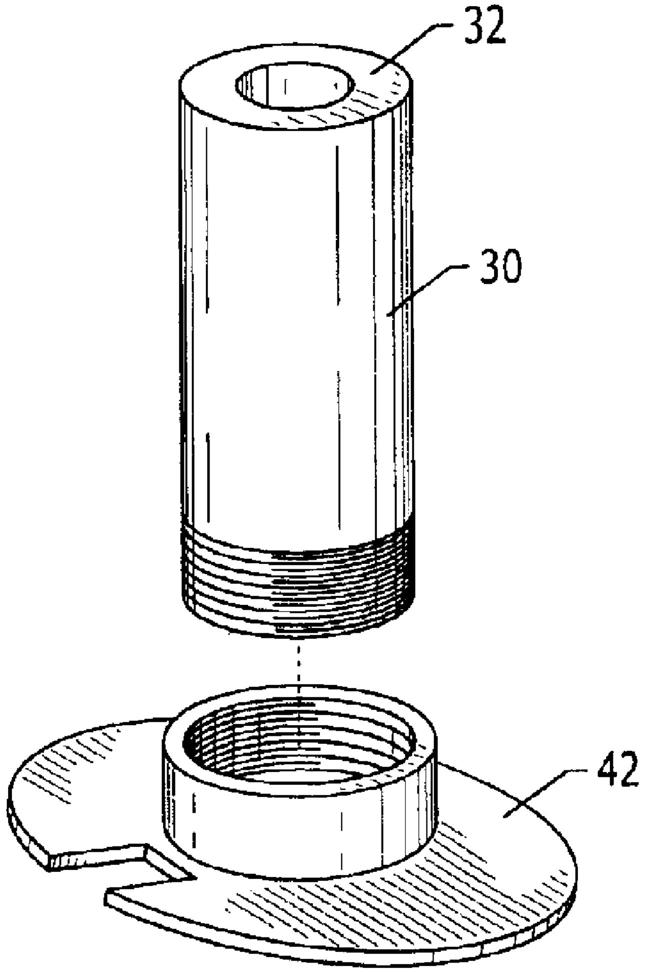
FIG. 8 is a perspective view of a lever member having an interchangeable end member that matches the shape of the surface of the workpiece according to one embodiment of the present invention.

The flanged end 42 of the lever member 30 may be interchangeable. As shown in FIG. 8, for example, the flanged end of the lever member may be disengagable from the remainder of the lever member. In the illustrated embodiment, the flanged end of the lever member may be threadably engaged to the remainder of the lever member, although the flanged end may be removably attached to the remainder of the lever member in other manners. While a single flanged end of the lever member is depicted in FIG. 8, the lever member could include multiple flanged ends; each having a different shape and/or being disposed at a different angle relative to the longitudinal axis defined by the drive shaft 28. Thus, during the removal of a fastener 12, the flanged end that best matches the shape of that portion of the workpiece 14 in the vicinity of the fastener may be selected and attached to the remainder of the lever member. If the shape of the workpiece in the vicinity of another fastener that is to be thereafter removed is different, a different flanged end that better matches the shape of the workpiece may be selected, the prior flanged end may be disengaged from the remainder of the lever member and the newly selected flanged end installed in its place. For purposes of illustration, the flanged end of the lever member depicted in FIG. 8 also defines a notch for accommodating the head ends of other fasteners or other raised features on the workpiece.

In operation, the lever member 30 is generally initially positioned such that the pulling plug 20 extends therebeyond. In the embodiment depicted in FIGS. 1 and 2, for example, the lever member may be threadably retracted on the drive shaft 28 so that the pulling plug extends therebeyond. Also, as an initial matter, the end of the fastener opposite the head end 16 may be tapped toward the workpiece 14 so as to be flush with the surface of the workpiece. By tapping the end of the fastener in this manner, the head end of the fastener is generally positioned slightly above and spaced from the front surface of the workpiece. As such, the pulling plug can be positioned so as to receive the head end of the fastener within the internal cavity defined by the pulling plug. As shown in FIG. 4, the lever member 30 is then positioned so as to operably engage the surface of the workpiece 14, such as by being threadably advanced along the drive shaft 28 until the end of the lever member contacts the surface of the workpiece. Thereafter, the drive shaft may be retracted such that the pulling plug 20 and, in turn, the fastener 12 is likewise retracted in a direction away from the surface of the workpiece as shown in FIG. 5, thereby removing the fastener from the workpiece. As described above, the drive shaft can be retracted in various manners, including the threaded retraction of the drive shaft or the retraction of the drive shaft by a mechanized actuation mechanism 36 of various types.

In instances in which the head end 16 of the fastener 12 has a polygonal shape, the interior cavity defined by the pulling plug 20 also generally has a corresponding polygonal shape. As such, rotation of the drive shaft 28 and, in turn, the pulling plug also causes the fastener to rotate as a result of the engagement of the polygonal head of the fastener within the polygonally shaped interior cavity defined by the pulling plug. This rotation of the fastener during the removal process is generally advantageous for threaded fasteners since the rotation reduces, if not eliminates, thread scrubbing of the threads of the fastener and/or internal threads within the opening defined by the workpiece. Additionally, the rotation of the threaded fastener assists in the removal of the fastener such as by seemingly lifting the fastener from the opening.

Alternatively and with reference to FIG. 6, the drive shaft 28 may be retracted by threadably advancing the lever member 30 along the drive shaft while preventing the drive shaft from rotating. As such, the fastener 12 may be removed without causing the fastener to be rotated. While rotation of the fastener is advantageous in some circumstances as described above, it is sometimes desirable to removed the fastener without subjecting the fastener to rotation, such as in instances in which a bent fastener is being removed and any rotation of the fastener would undesirably enlarge the aperture.

As such, the apparatus 10 of the present invention is capable of removing a wide variety of fasteners 12. Advantageously, the apparatus of the present invention maintains the fastener in axial alignment with the corresponding opening defined by the workpiece 14 such that the fastener is removed in a manner that reduces, if not eliminates, damage to the fastener and the workpiece. Moreover, the apparatus of the present invention is capable of removing fasteners in situations in which the end of the fastener opposite the head end 16 is relatively inaccessible such that the fastener is not suitable for removal by use of a drift or a punch as in conventional fastener removal techniques. Moreover, the controlled removal of a fastener provided by the apparatus of the present invention permits fasteners to be removed from workpieces formed of a variety of materials including softer materials, such as aluminum, that might otherwise be damaged by conventional fastener removal techniques.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for removing a fastener from a corresponding aperture defined by a workpiece, the apparatus comprising:

a pulling plug for engaging a head of the fastener, a drive shaft operably connected to said pulling plug; and a sleeve member that is threadably engaged by said drive shaft and is capable of being urged into operable contact with a surface of the workpiece without positively engaging the workpiece, wherein said drive shaft is capable of being threadably retracted so as to move in a direction away from the workpiece while said sleeve member continues to be urged into operable contact with the surface of the workpiece without positively engaging the workpiece, thereby correspondingly moving said pulling plug away from the surface of the workpiece in to remove the fastener from the aperture defined by the workpiece, and wherein the operable connection of said drive shaft to said pulling plug is such that said drive shaft and said pulling plug rotate in unison so that the threadable retraction of said drive shaft also imparts both relative axial and rotational movement between said pulling plug and said sleeve member.

2. An apparatus according to claim 1 wherein said sleeve member includes a first end having a shape corresponding to the surface of the workpiece.

3. An apparatus according to claim 2 wherein the first end of said sleeve member comprises a flanged end.

4. An apparatus according to claim 2 wherein the first end of said sleeve member is disposed at a non-orthogonal angle relative said driver shaft.

5. An apparatus according to claim 2 wherein the first end of said sleeve member defines a notch.

6. An apparatus according to claim 1 wherein said sleeve member defines a cylindrical passage through which said drive shaft at least partially extends.

7. An apparatus according to claim 1 wherein said sleeve member comprises a collar defining an aperture for snugly receiving said drive shaft.

8. An apparatus according to claim 7 wherein said collar threadably engages said drive shaft.

9. An apparatus according to claim 8 wherein the fastener has threads, and wherein the portion of said drive shaft that threadably engages said collar has threads that are oppositely oil oriented to the threads or the fastener.

10. An apparatus according to claim 8 wherein said drive shaft has threads for threadably engaging said pulling plug, and wherein the portion of said drive shaft that threadably engages said collar also has threads that are oppositely oriented to the threads of the portion of the drive shaft that threadably engages said pulling plug.

11. An apparatus according to claim 7 wherein said collar is integral with a remainder of said sleeve member.

12. An apparatus according to claim 1 wherein said pulling plug is capable of extending beyond said sleeve member in order to engage and disengage the fastener.

13. An apparatus for removing a bolt from a corresponding aperture defined by a workpiece, the apparatus comprising:

a pulling plug for receiving a polygonal head of the bolt, said pulling plug comprising a plurality of interior surfaces angularly disposed with respect to one another to thereby define an interior cavity for receiving and mating with the polygonal head of the bolt;

a drive shaft operably connected to said pulling plug; and a sleeve member that is threadably engaged by said drive shaft and is capable of being urged into operable contact with a surface of the workpiece, wherein said drive shaft is capable of being threadably retracted so as to remove the bolt from the aperture defined by the workpiece, wherein the operable connection of said drive shaft to said pulling plug is such that said drive shaft and said pulling plug rotate in unison so that the threadable ratraction of said drive shaft also imparts both relative axial and rotational movement between said pulling plug and said sleeve member.

14. An apparatus according to claim 13 wherein said sleeve member is capable of being urged into operable contact with the surface of the workpiece without positively engaging the workpiece.

15. An apparatus according to claim 14 wherein said sleeve member comprises a flanged end that is capable of being urged into operable contact with the surface of the workpiece.

16. An apparatus according to claim 13 wherein said pulling plug is capable of extending beyond said sleeve member in order to engage and disengage the fastener.

17. An apparatus according to claim 13 wherein said sleeve member defines a cylindrical passage though which said drive shaft at least partially extends.

18. An apparatus according to claim 17 wherein said sleeve member comprises a collar for threadably engaging said drive shaft.

19. An apparatus according to claim 18 wherein the bolt has threads and wherein the portion of said drive shaft that threadably engages said collar has threads that are oppositely oriented to the threads of the bolt.

20. An apparatus according to claim 18 wherein said drive shaft has threads for threadably engaging said pulling plug, and wherein the portion of said drive shaft that threadably engages said collar also has threads that are oppositely oriented to the threads of the portion of the drive shaft that threadably engages said pulling plug.

21. An apparatus according to claim 17 wherein said sleeve member comprises an integral collar that defines an aperture for receiving said drive shaft.

* * * * *